J. SMITH.
Harrows.
No. 137,254. Patented March 25, 1873.
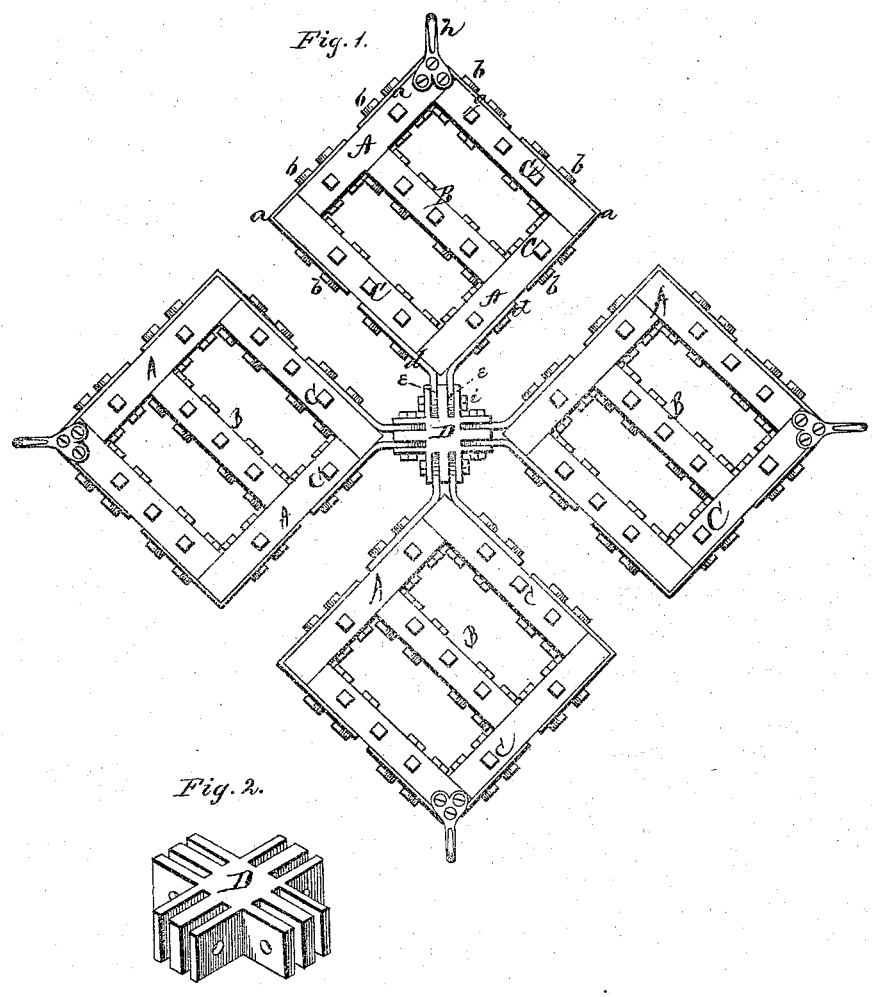
Witness:
Inventor.
Joseph Smith
per
Attorneys.

UNITED STATES PATENT OFFICE.

JOSEPH SMITH, OF WOODLAND, MICHIGAN.

IMPROVEMENT IN HARROWS.

Specification forming part of Letters Patent No. 137,254, dated March 25, 1873.

*To all whom it may concern:*

Be it known that I, JOSEPH SMITH, of Woodland, in the county of Barry and in the State of Michigan, have invented certain new and useful Improvements in Harrows; and do hereby declare that the following is a full, clear, and exact description thereof, reference being had to the accompanying drawing and to the letters of reference marked thereon making a part of this specification.

The nature of my invention consists in the construction and arrangement of a harrow, as will be hereinafter more fully set forth.

In order to enable others skilled in the art to which my invention appertains to make and use the same, I will now proceed to describe its construction and operation, referring to the annexed drawing, in which—

Figure 1 is a plan view of my entire harrow; and Fig. 2 is a perspective view of the center coupling.

My harrow is composed of four smaller harrows connected or coupled together in the center. Each of these smaller harrows is formed of a square frame, A, with a center-bar, B, and teeth C C inserted in the same in any suitable manner and of any number desired. Three corners of each frame are bound on the outside each with an iron strap, $a$, fastened with bolts and nuts $b\ b$. The fourth corner has a metal strap, $d$, bolted on each side, and the adjoining ends of these two straps extend outward, forming two parallel ears, $e\ e$. The four harrows A B C are connected together by a central coupling, D, cast in the shape of a four-armed cross, each arm having two longitudinal parallel slots for the insertion of the ears $e\ e$, which are then pivoted in the same by a bolt, $i$. Each of the four harrows can thus turn or rise and fall independent of the other to accommodate itself to the inequalities of the ground. At the outer corner of each harrow is a hook, $h$, for the attachment of the team, so that either of the four small harrows may be used in front, as may be most convenient.

Having thus fully described my invention, what I claim as new, and desire to secure by Letters Patent, is—

A harrow composed of smaller harrows, which are connected together by a central coupling, D, the whole constructed and operating as and for the purpose set forth.

In testimony that I claim the foregoing I have hereunto set my hand this 28th day of January, 1873.

JOSEPH SMITH.

Witnesses:
  E. SAWDY,
  CALVIN SAWDY.